United States Patent [19]
King et al.

[11] Patent Number: 5,619,610
[45] Date of Patent: Apr. 8, 1997

[54] OPTICAL TERMINATOR

[75] Inventors: Wilton W. King, Chamblee, Ga.;
William R. Lambert, Chester, N.J.

[73] Assignee: Lucent Technologies Inc., Murray Hill, N.J.

[21] Appl. No.: 581,077

[22] Filed: Dec. 29, 1995

[51] Int. Cl.⁶ ................................................ G02B 6/00
[52] U.S. Cl. .............................................. 385/139
[58] Field of Search ............................... 385/31, 39, 52, 385/53, 76, 88, 89, 139, 140

[56] References Cited

U.S. PATENT DOCUMENTS

| | | | |
|---|---|---|---|
| 4,186,999 | 2/1980 | Harwood et al. | 350/96.21 |
| 4,496,211 | 1/1985 | Daniel | 385/31 |
| 4,512,630 | 4/1985 | Runge | 350/96.21 |
| 4,586,783 | 5/1986 | Campbell et al. | 385/32 |
| 4,934,785 | 6/1990 | Mathis et al. | 350/96.2 |
| 4,998,795 | 3/1991 | Bowen et al. | 3509/96.2 |
| 5,058,983 | 10/1991 | Corke et al. | 385/78 |
| 5,079,643 | 1/1992 | Horiuti et al. | 350/1.1 |
| 5,082,345 | 6/1992 | Cammons et al. | 385/60 |
| 5,263,103 | 11/1993 | Kosinski | 385/31 |

*Primary Examiner*—Akm E. Ullah
*Attorney, Agent, or Firm*—Michael A. Morra

[57] ABSTRACT

An optical terminator 100 is designed to make end-to-end contact with an optical fiber 31 whose end portion is held within a cylindrical ferrule 400. The optical terminator minimizes reflections that occur when an optical path encounters an abrupt change in refractive index (e.g., when the end face of the optical fiber encounters an air gap). The optical terminator comprises a solid cylindrical structure, molded from a polymeric material (e.g., a methylpentene copolymer) having a refractive index similar to that of the optical fiber. The proximal end of the terminator abuts the cylindrical ferrule and is solid for a predetermined distance 'd' along its longitudinal axis in order to provide at least 20 dB attenuation. The polymeric material is moldable and exhibits minimum indentation creep under a compressive load at elevated temperatures. In one embodiment, the terminator 100 is installed in a plug configuration. In this configuration, a coupling apparatus 20 is needed to interconnect the connector 40 that holds an optical fiber with the plug terminator 10 that holds the terminator. In another embodiment, the terminator 100 is installed within a receptacle configuration. In this configuration, the connector 40 that holds the optical fiber can be directly attached to the receptacle terminator 50.

24 Claims, 4 Drawing Sheets

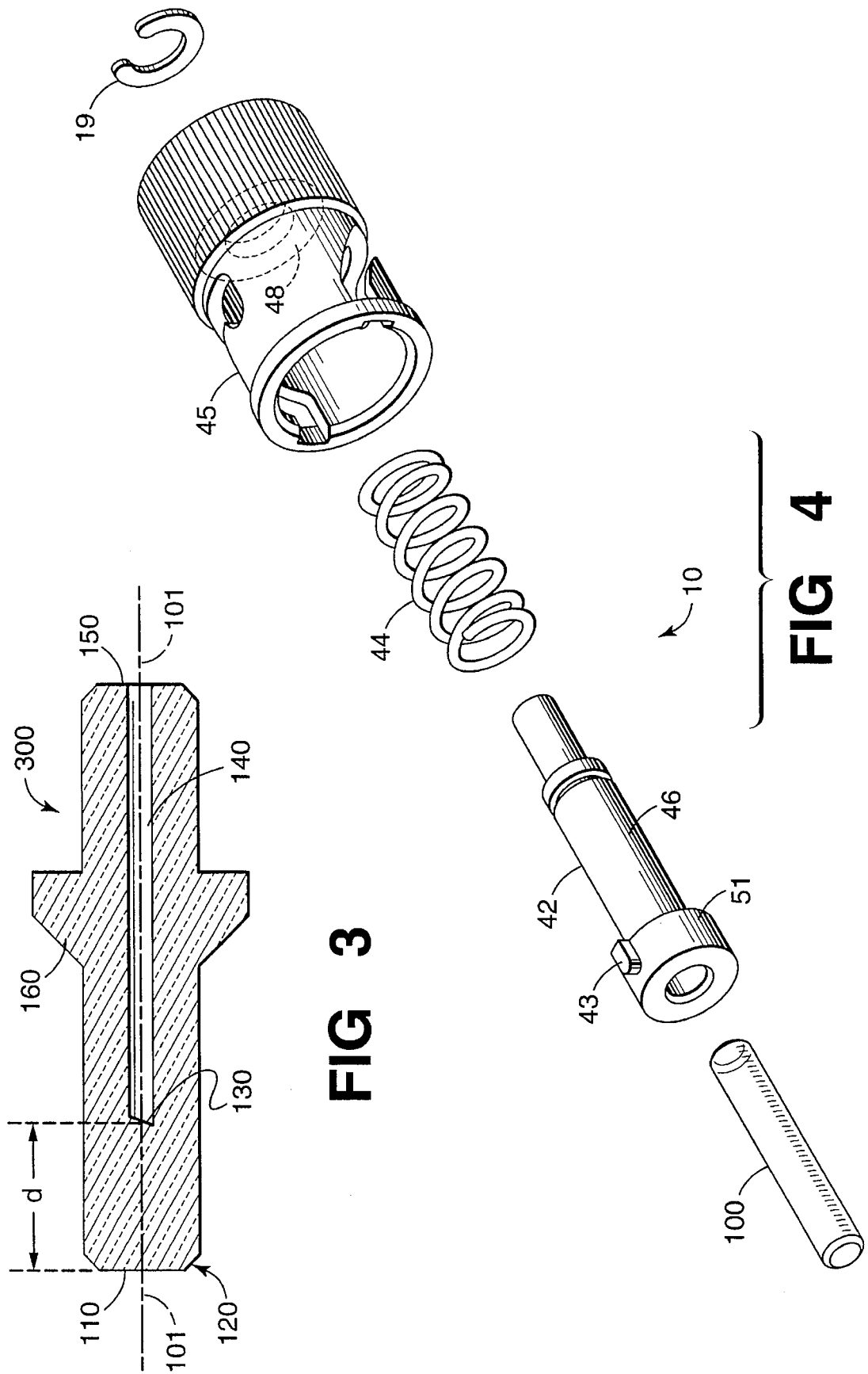

OPTICAL TERMINATOR

TECHNICAL FIELD

This invention relates generally to optical communication devices, and more particularly to a low-reflection terminator for an optical waveguide or the like.

BACKGROUND OF THE INVENTION

It is widely believed that most communication systems will eventually include optical fiber transmission equipment for large portions thereof. In broadband landline communications, optical fibers already surpass coaxial cable in new system deployment because they provide extremely large bandwidth at favorable cost. Moreover, it may not be long before optical fibers extend all the way to the home—replacing both copper wires and coaxial cables. And, similar to electrical transmission paths, it is also important to properly terminate optical transmissions paths within the system. For example, one of the limitations encountered in optical fiber systems relates to noise arising from optical power reflections. Such reflections generally occur at any discontinuity in an optical transmission path, including the end of an optical fiber where a portion of the incident light is reflected back toward the source. Optical power reflected in this manner may reflect once again when it arrives at the source or other discontinuity in the system, adding an unwanted noise component to the signal. Moreover, optical power that is reflected back into a source can also corrupt the fundamental operation of the source, typically a laser. (See, for instance, R. Rao et al., *Electronics Letters*, Vol. 22 (14) pages 731–732 (1986). Accordingly, control of reflections is an important consideration in the design of optical fiber systems.

Low reflectance attenuators are known in the art and one is described in U.S. Pat. No. 5,082,345 in which an attenuator disc, made from polymethylmethacrylate (PMMA) plastic, is slidably suspended from a longitudinal slot in an alignment sleeve. Spring-loaded optical plugs are inserted into opposite ends of the sleeve and engage opposite sides of the disc to provide between 5 and 20 dB of attenuation depending on its thickness. However, such an arrangement is cumbersome and costly. Moreover, PMMA has an index of refraction of about 1.50 which, at best, produces −40 dB reflection, which is too much.

U.S. Pat. No. 5,263,103 discloses an optical fiber terminator comprising a length of core-less, non-guiding (undoped or doped) silica fiber having substantially the same diameter as the fiber to be terminated (e.g., 125 μm). The amount of reflection varies according to the length and composition of the terminator, and by the use of non-reflecting coating applied to the optical fiber terminator. The optical fiber terminator is then attached to an active fiber by fusion splicing or index-matched epoxy. Unfortunately, handling such a small component is cumbersome, and conventional fusion splicers typically require that the fiber ends be relatively flat—meaning that this small component may need to be additionally processed prior to installation. Furthermore, in many applications, the optical fiber to be terminated is already installed in a standard optical connector, and it is undesirable to strip away the connector merely to access the optical fiber itself.

The last-mentioned difficulty is solved by another known terminator which comprises a length of fiber that is held within a cylindrical ferrule. The cylindrical ferrule includes an end face which abuts the optical fiber to be terminated. One end of the length of fiber terminates in the end face and is cleaved perpendicular (e.g., 90°) to the central axis of the ferrule, whereas the other end of the length of fiber is cleaved at an angle (e.g., 80°) with respect to the central axis. And while such a terminator provides good results, its manufacturing cost is far too high.

What is sought and what does not appear to be available in the prior art is an optical terminator which is inexpensive to manufacture and easily attaches to an optical fiber that is already installed within a cylindrical ferrule.

SUMMARY OF THE INVENTION

An optical terminator is designed to make end-to-end contact with an optical fiber whose end portion is held within a cylindrical ferrule. The optical terminator comprises a generally cylindrical structure whose diameter is approximately equal to the cylindrical ferrule and whose refractive index is approximately equal to the optical fiber. The optical terminator has a longitudinal axis which extends from a distal end to a proximal end thereof. The proximal end is adapted to abut the cylindrical ferrule without an air gap between the fiber and the terminator, and the proximal end is solid for a predetermined distance along the longitudinal axis in order to provide a suitable amount of attenuation.

In illustrative embodiments of the invention, the optical terminator is disposed within a structure that facilitates mechanical interconnection with the cylindrical ferrule. Preferably, the refractive index of the optical terminator is n=1.47±0.01. Moreover, the terminator is preferably molded from polymeric material such as a methylpentene copolymer that exhibits minimum indentation creep under a compressive load at elevated temperatures.

In one embodiment, the terminator is disposed in a optical connector; and a coupling apparatus is used to mechanically interconnect it with the connector that holds the optical fiber. In another embodiment of the invention, the terminator is held in an alignment sleeve which is disposed within a receptacle. This receptacle directly attaches to the optical connector that holds the optical fiber.

In all embodiments of the invention, the optical terminator minimizes the reflection that occurs when an optical path encounters a discontinuity in the fiber optic transmission path. The terminator delivers about 20 dB of optical power loss along its length so that a total attenuation of about 55 dB is achieved without the use of non-reflective coatings (20 dB loss in each direction, plus 15 dB loss at the distal end of the terminator).

BRIEF DESCRIPTION OF THE DRAWING

The invention and its mode of operation will be more clearly understood from the following detailed description when read with the appended drawing in which:

FIG. 3 is a cross-section view of an optical terminator in accordance with the present invention;

FIG. 4 is an exploded perspective view of the optical terminator installed a plug connector configuration;

DETAILED DESCRIPTION

Figure 1:
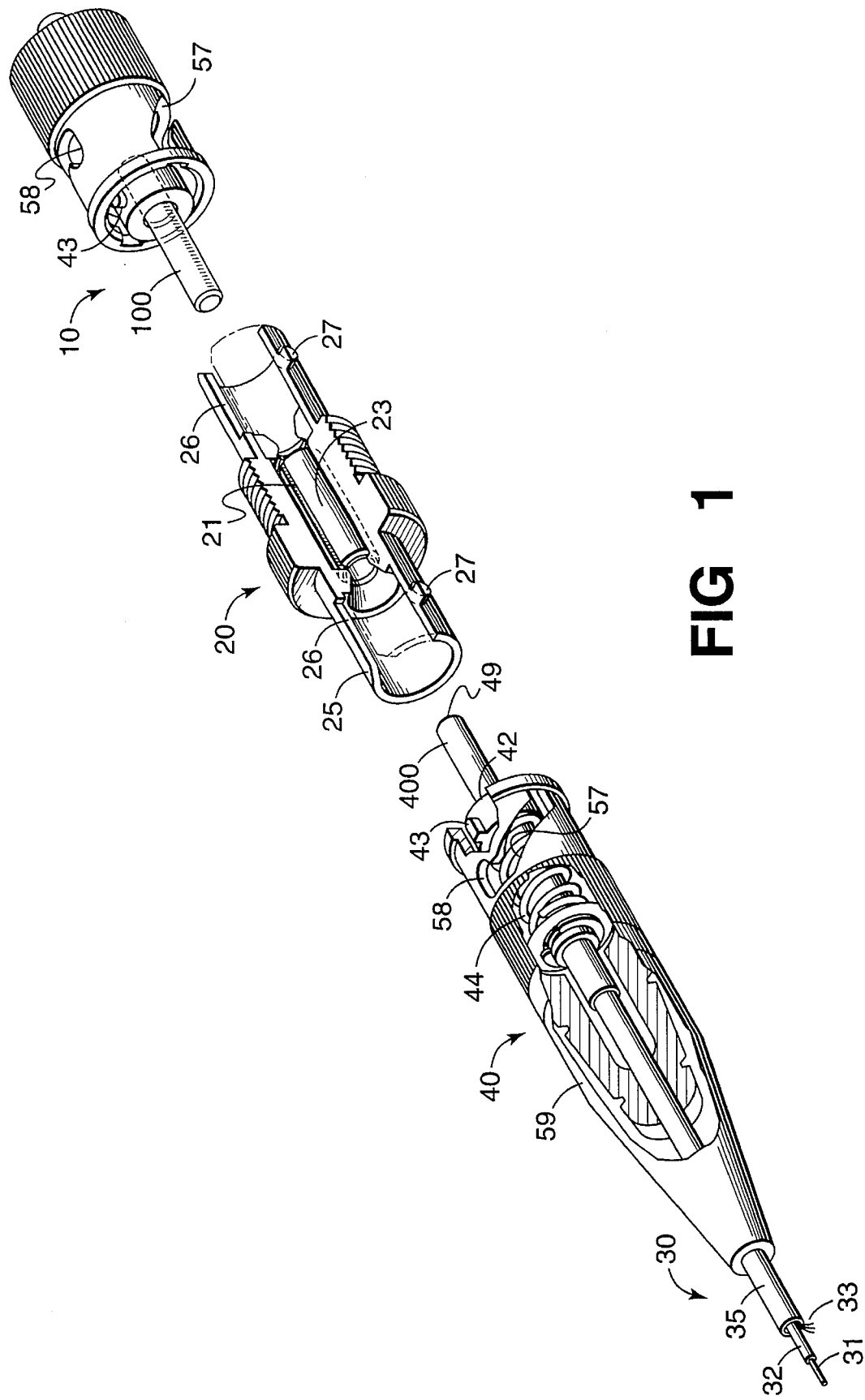
FIG. 1 is an exploded perspective view of an optical fiber termination system.
Figure 2:
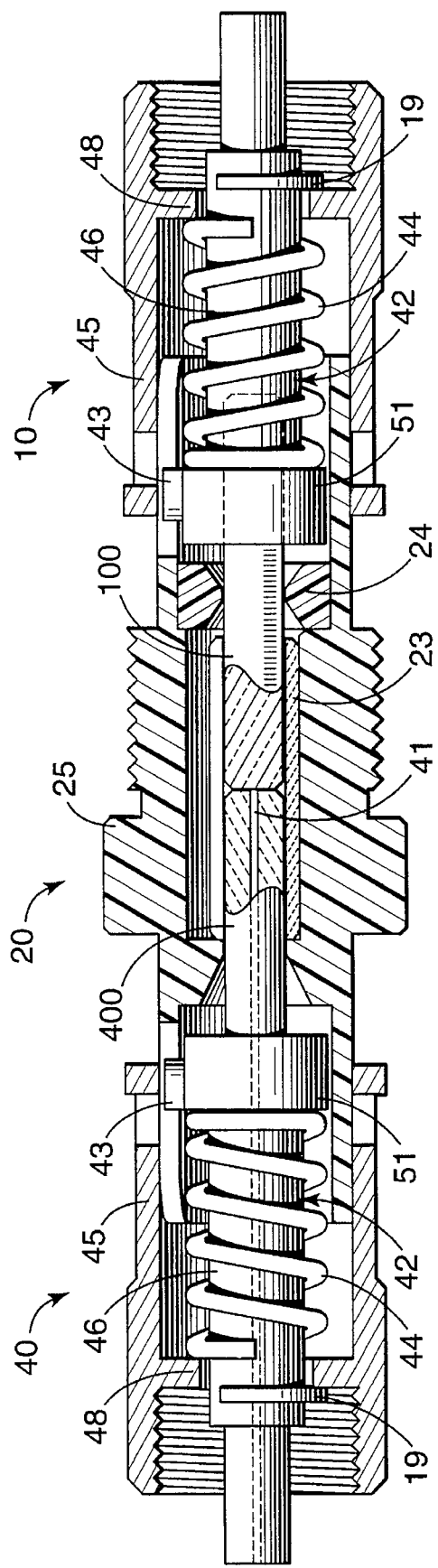
FIG. 2 is an elevational view of the optical fiber termination system of FIG. 1 shown interconnected and in partial cross section.

Referring now to FIG. 1 and 2, an optical fiber terminating system having low reflectance is shown. Since the terminating system is best illustrated using known optical connectors, a brief discussion of optical connector design is given. In particular, the ST® connector 40 is discussed—ST being a registered trademark of AT&T Corp. And while a brief discussion is provided herein, the detailed design of this connector is disclosed in U.S. Pat. No. 4,934,785 which issued on Jun. 19, 1990 and is hereby incorporated by reference. It is understood that the ST connector is only used for the purpose of illustration, and that the present invention may be included in a number devices that facilitate mechanical interconnection in a fiber terminating system.

Optical fiber 31 includes a core and a cladding surrounded by one or more layers of an acrylate coating material for protection. Additionally, the optical fiber may be surrounded by a layer of polyvinyl chloride (PVC) to provide what is referred to as a buffered fiber 32. Further, a sheath system is shown, illustratively comprising strength members 33 made from aramid fibrous material and an outer jacket 35 made from PVC. Together, these elements form an optical cable 30 which has excellent transmission and handling characteristics, but which cannot be joined to other optical equipment without a connecting arrangement. For that purpose, an optical connector 40 is needed.

An end portion of optical fiber 31 terminates in a plug 400 which is interchangeably referred to as a ferrule. Plug 400 is generally cylindrical and has an axial passageway 41 (see FIG. 2) that extends from one end to the other. This plug is illustratively made from a ceramic material, although glass and plastic plugs are frequently used. Plug 400 has an outer diameter of about 2.5 millimeters (mm), although a new generation of miniature plugs is now available having an outer diameter of 1.25 mm. An end face 49 of the plug 400 includes an opening into passageway 41.

It is necessary to prepare fiber 31 for attachment to optical connector 40. Accordingly, the acrylate coating, the buffer layer 32, the strength members 33, and the outer jacket 35 are removed from an end portion of optical fiber 31. The uncoated end portion of the optical fiber 31 is then inserted and secured within the passageway 41 of plug 400, and the end face of the optical fiber is cleaved and polished. Connector 40 also includes a base member (barrel) 42 made of a plastic or metallic material, a compression spring 44 and a tubular cap 45 made of a plastic or a metallic material. It should be observed that the plug 400, the base member 42 and the cap 45 each has a cylindrical cross section. The base member 42 includes a separate orienting or alignment key 43 which projects radially outward.

The base member 42 includes a small diameter portion 46 (see FIG. 2) which extends through an opening in an internally disposed collar 48 in the cap 45. A retaining washer 19 circumscribes the small diameter portion on the outer side of the collar. The spring 44 disposed about the smaller diameter portion 46 of the base member 42 between the collar and the large diameter portion 51. As a result of this arrangement, the spring 44 biases the base member 42 outwardly from the cable to hold the connector body within the cap 45. It can be seen that the cap 45 includes a slot 57 which extends rearwardly from a front end of the cap toward a pin-capturing portion 58. The slot 57 and pin-capturing portion 58 are used for securing connector 40 to a mating device such as coupling apparatus 20.

Completing the connector 40, there is shown a portion 59 which may extend from the cap 45 along the optical cable in a conically shaped configuration. This portion of the connector 40 provides strain relief for the connector and ensures that the cable can withstand repeated bends in use after interconnection with another cable without undue stresses being imparted to the optical fibers.

The optical fiber terminating system further includes a coupling apparatus 20 comprising a housing 25 and an alignment sleeve 23. The sleeve includes a longitudinal slot 21 which, in a preferred embodiment, is made of zirconia. The sleeve 23 is disposed within a housing 25 and maintained therein by a retainer 24. The housing includes oppositely extending keyways 26—26 with each keyway 26 being associated with and adapted to receive a key 43. Further, associated with each keyway at each end portion of the housing 25 are two diametrically opposed radially extending pins 27—27 each of which is displaced 90° from the associated keyway. When plug 400 is to be inserted into sleeve 23, key 43 is aligned with keyway 26 in the sleeve 23. The plug 400 is inserted into the sleeve as the alignment key 43 is moved along the keyway 26. At the same time, each latching pin 27 enters and moves along slot 57. At the end of the travel of the plug 400, each latching pin becomes disposed within a forwardly extending portion 58 of slot 57.

The optical fiber terminating system finally includes a plug connector having optical terminator 100 installed therein. Because optical terminator 100 has the same general shape and size as plug 400, it is readily makes end-to-end contact therewith using a known connector structure and a known coupling apparatus. It will be observed that connector structures 10 and 40 are substantially similar. Optical terminator 100 is preferably a solid structure; nevertheless, it can be constructed with a flange and a cavity as shown in FIG. 3.

Reference in now made to FIG. 3 which discloses an optical terminator 300 in accordance with the present invention. Optical terminator 300 is a generally cylindrical structure and has a longitudinal axis 101—101 which extends from its proximal end face 110 to its distal end face 150. It is preferably molded from a thermoplastic material in the shape of a conventional ferrule so that it can be installed in a conventional connector (e.g., ST, SC, FC) and used with existing hardware to terminate unused fibers. Conventional connectors utilize ferrules having a diameter of about 2.5 mm; although a new generation of miniature connectors is becoming available with ferrules having a diameter of about 1.25 mm. The present invention specifically contemplates both of these diameters as well as others. So that it can be easily inserted into existing hardware, a bevel 120 is provided at the proximal end 110 where it will interface with a conventional ferrule having an optical fiber disposed along its central axis (collinear with longitudinal axis 101 of the terminator). Terminator 300 is solid for a predetermined distance 'd' along the longitudinal axis at the proximal end 110. The minimum length of 'd' depends upon the attenuation characteristic of the material used in making optical terminator 300 and the amount of reflection present at surface 130, both of which are discussed below.

Optical terminator 300 is shown having a circumferentially disposed flange 160 which is useful for controlling the depth of insertion of the terminator into a tubular structure. Additionally, terminator 300 includes an opening in its distal end 150 which extends into a cavity 140. Molded plastic ferrules frequently include a cavity to facilitate fiber insertion. It is possible to modify the tool used to make such ferrules so that it can be used for molding an optical terminator 300. Such modifications include the elimination of any axial passageway at or near proximal end 110, and the selection of appropriate molding materials.

Optical Reflections

Signal reflections present a serious problem in high capacity optical fiber systems since the reflected power can interfere with the proper operation of singlemode lasers. Advantageously, optical terminator 300 reflects only a very small amount of the transmitted light back toward its source. Briefly, a first portion of the transmitted light is reflected at the discontinuity (in refractive index) between the cylindrical ferrule and the optical terminator. However, most of the transmitted light enters the optical terminator where a second portion is reflected at discontinuities therein after being attenuated by losses within the terminator. Together, the first and second portions are more than about 50 dB below the power level of the transmitted light (which is equivalent to saying that the overall reflectance is less than about −50 dB).

Reflectance is a function of the material index of refraction and the index difference of the interfaces, and is given by the equation:

$$\text{Reflectance} = -10 \log [(n_0 - n_i)^2 / (n_0 + n_i)^2]$$

For example, in a glass-to-air interface ($n_0$=1.0 for air, and $n_1$=1.47 for glass) the reflectance is approximately 14.4 dB (3.6%). For two materials with only slight differences in $n_i$, (e.g., $n_1$=1.48 vs. 1.47) the reflectance is −49 dB (0.0011%).

Applying this information to FIG. 3, light enters terminator 300 at its proximal end surface 110 and a portion is reflected back towards the source. Most of the light continues traveling along longitudinal axis 101—101 of the terminator 300 for a predetermined distance 'd' before it encounters a discontinuity at surface 130. Reflections can be reduced at surface 130 in several ways:

(1) Surface 130 can be formed at an angle α (e.g., 80°) with respect to the longitudinal axis. This is particularly helpful if this is a smooth surface; and (2) Surface 130 can be coated with an anti-reflective material (see, for example, U.S. Pat. No. 5,079,643).

Nevertheless, it is preferable to avoid either of these techniques by using a material in the construction of terminator 300 which attenuates light and by making distance 'd' suitably long so that even if light is reflected by surface 130, it will be severely attenuated by the time it travels back to proximal end 110. In the present invention, distance 'd' is about 2 mm (0.080 inches) and, with the polymeric material used (see discussion below) provides about 20 dB of attenuation. Since reflected light travels a total distance of about 4 mm, the total attenuation is 40 dB. The discontinuity at surface 130 (polymer/air) provides a reflection of about −15 dB. Adding these together yields an optical reflection corresponding to the second portion, which is about 55 dB below the incident signal.

Material Selection

Although various glass materials can be used in the practice of the present invention, polymeric materials are preferred. Accordingly, materials that are suitable for use in constructing optical terminator 100 preferably exhibit the following properties:

1. Refractive index which enables a −50 dB reflection for normal incident light at wavelengths commensurate with fiber optic transmission, e.g. 1.3 μm and 1.5 μm which is at least n=1.47±0.01 is the nominal refractive index of the transmission fiber.

2. Low creep modulus sufficient to meet +70° C. aging criteria, in order to ensure reliable long term performance in various thermal environments. The creep modulus is to some extent reflected in other thermomechanical properties of polymers which are more typically reported in the literature, i.e., heat deflection temperature under load (HDTL) and Vicat softening temperature. In practice the plastic terminator will be under a compressive load of about 2 pounds which is applied through spring-loaded contact by the opposing ferrule which contains an optical fiber. Deformation of the plastic by this compressive force will result in indentation of the plastic terminator. This deformation may subsequently compromise the performance of the terminator as manifested by an increased reflection following demating/mating of the optical interconnect.

3. Injection moldable in order to facilitate low-cost manufacturing and to optimize design flexibility.

There are only a limited number of polymeric materials which meet these criteria. Beginning with the first requirement, i.e. a refractive index of 1.47±0.01, the refractive index of several homogeneous thermoplastics is presented by J C. Seferis—*Refractive Indices of Polymers*, Table II, pp. 453–457, in the *Polymer Handbook*, Third Edition, J. Brandup and E. H. Immergut, Eds., Wiley, 1989. Many of these materials are acrylates which possess glass transition temperatures ($T_g$) well below 90° C., or are opaque at the near infrared (IR) wavelengths characteristic of fiber optic transmission, e.g. polyethylene and polypropylene. The low glass transition temperature of acrylates can be modified upon blending with other compounds such as polyimide (e.g. Kamax™, ELF Atochem) or PVDF (Kynar™, ELF Atochem). However, these blends typically exhibit an unacceptably high refractive index. Other polymeric blends or copolymeric materials can also be used.

A commercially available thermoplastic material which meets the combined requirements heretofore enumerated is a methylpentene copolymer manufactured under the tradename TPX™ is a copolymer of propylene and 4-methylpentene-1 and exhibits the following relevant properties (e.g. grade RT 18 XB):

| Transparency | ASTM D1746 | 92% |
| Refractive Index ($n^{20}_D$) | ASTM D542 | 1.463 |
| Heat Deflection Temperature (66 psi) | ASTM D648 | 90° C. |
| Hardness | ASTM D785 | 85 R |

Furthermore, the transmittance at 1.3 μm and 1.5 μm is 90% and 88%, respectively. Thermal mechanical analysis (TMA) of TPX™ using a 100 gm penetration probe indicates that 70° C. the dimensional change is 12 μm. For purposes of comparison, Kamax™, an imidized acrylic also used for this optical terminator application exhibits a dimensional change of 8 μm at 70° C. as determined by a similar TMA analysis. While this extent of dimensional change is acceptable, it is not optimal. A material with a higher heat distortion temperature would be preferred.

While we have quoted the HDTL to reflect the mechanical properties of the TPX thermoplastic, other thermal and mechanical properties, if available can provide additional insight into the performance of the terminator in use. These include the deflection temperature under flexural load (HDTL, ASTM D648, typically measured with loads of 264 psi and 66 psi), Vicat softening temperature (ASTM D1525) and the glass transition temperature $T_g$. However, since creep phenomena are determined by the fundamental structure of the polymer matrix in response to specific loading conditions, relevant creep information is best obtained from application specific tests. Hence, while values of HDTL, Vicat softening temperature and $T_g$ can provide a rough indication of the appropriateness of a thermoplastic for the optical attenuator application, only an application specific test can provide a substantive evaluation. TMA with a penetration probe is a routine laboratory test procedure which can provide information which may be directly related to the "indentation resistance" of the optical terminator.

Using nearly the same parts that are used in the construction of optical connector 40 (see FIG. 1 and 2), FIG. 4 discloses an exploded perspective view of the optical terminator 100 constructed in a plug configuration which is hereinafter referred to as a plug termination. Plug termination 10 includes optical terminator 100 which is adhesively installed in base member 42, after assembly, a compression spring 44 is placed around that portion 46 of the base member 42 which has a relatively small diameter. The terminator/base member assembly is then inserted into tubular cap 45 and captured therein via retaining washer 19. The retaining washer circumscribes the small diameter portion 46 of the base member on the outer side of an internally disposed collar 48 (see FIG. 2) within the tubular cap 45. As a result of this arrangement, spring 44 biases the base member 42, and hence optical terminator 100, toward the left hand side of FIG. 4 so that the optical terminator can make end-to-end contact with an optical fiber. The spring not only functions to eliminate any air gap between the terminator and the optical fiber, but also to limit contact force to an amount (illustratively 2 pounds) that will not deform the end face of the optical terminator. Alternatively, the plug termination 10 can be constructed without a spring. In this situation, the spring within the optical connector 40 (see FIG. 2) will perform all of the above-identified spring functions.

Figure 5:
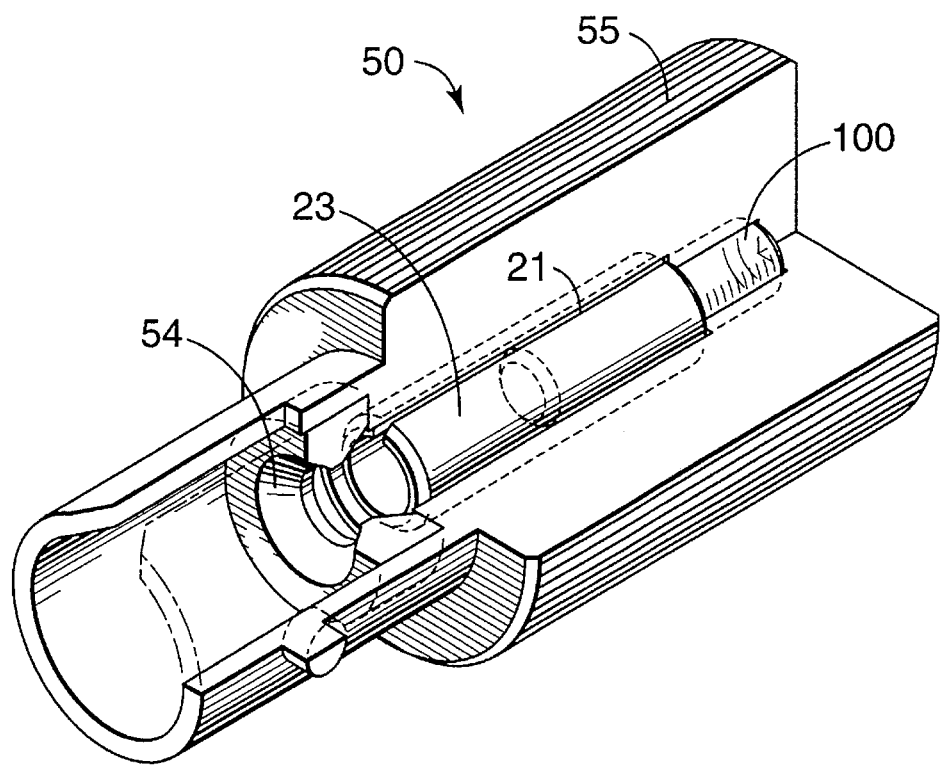
FIG. 5 is a perspective view of the optical terminator installed in a receptacle connector configuration.

Using nearly the same parts that are used in the construction of coupling apparatus 20 (see FIG. 1 and 2), FIG. 5 discloses a perspective view of the optical terminator 100 constructed in a receptacle configuration which is hereinafter referred to as a receptacle termination. Receptacle termination 50 includes optical terminator 100 which is held within a tubular alignment sleeve 23. In turn, the alignment sleeve 23 is disposed within a housing an maintained therein by a retainer 54. The sleeve 23 has a longitudinal slit 21 which allows the diameter of the sleeve to expand slightly and thereby hold the optical terminator 100 firmly therein. It is noted that optical terminator 100 is installed toward the back end of the sleeve and that it is not spring loaded. Such construction provides an economy of parts, and the spring within the optical connector 40 (see FIG. 2) performs the required spring functions. Advantageously, receptacle termination 50 directly terminates an unused fiber held within an optical connector without any additional parts. On the other hand, plug termination 10 (shown in FIG. 4) requires a coupling apparatus for interconnection with an optical connector.

Figure 6:
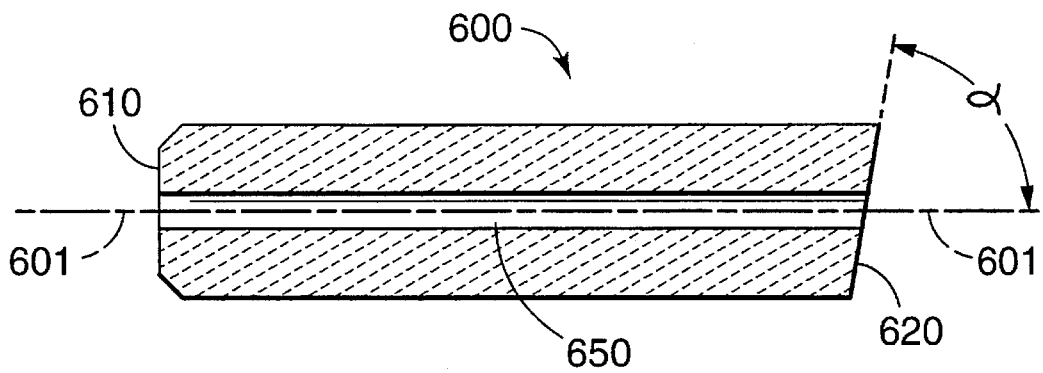
FIG. 6 is a cross-section view of a prior art optical terminator.

FIG. 6 discloses a known optical terminator 600, constructed in the form of a conventional ferrule having an axial passageway 650 which holds an optical fiber. The proximal end face 610 of the ferrule which makes end-to-end contact with another optical fiber is perpendicular to its longitudinal axis 601—601, whereas the distal end face 620 is cleaved at an angle α (illustratively 80°) which discourages reflections back toward the source. Moreover, the distal end face 620 may be coated with a non-reflective coating to further reduce reflections. Unfortunately, such construction is relatively expensive because the axial passageway 650 must be precisely positioned, more expensive materials are generally used in the construction of precise components, and the distal end face must be carefully angled to assure low reflectance.

Although various particular embodiments have been shown and described, it is understood that modifications are possible within the sprit and scope of the invention. These modifications include, but are not limited to, the use of glass, rather than plastic material, in the construction of the optical terminator; installation of the optical terminator in apparatus other than what are known as connectors, and other combinations of (1) reflective coatings, (2) material selection and (3) predetermined distance "d" to achieve a low reflectance optical terminator. Additionally, it is understood that the optical transmission of the terminator can be modified by incorporating scattering or absorbing materials such as carbon black into the polymeric material; and that the refractive index of the optical terminator can be selected to match the refractive index of a plastic fiber rather than glass.

We claim:

1. A low-reflectance optical terminator for making end-to-end contact with an optical fiber whose end portion is held within a cylindrical ferrule and the cylindrical ferrule is held within an optical connector, said optical terminator comprising a generally cylindrical structure whose diameter is approximately equal to the cylindrical ferrule and whose refractive index is approximately equal to the refractive index of the optical fiber, said terminator having a longitudinal axis which extends from a distal end to a proximal end thereof, said proximal end being solid for a predetermined distance 'd' along the longitudinal axis and having an end face that is perpendicular to the longitudinal axis; the power reflected by said terminator being at least about 50 dB below the power level of the incident optical signal and comprising the power sum of (i) and (ii) where:

(i)=the portion of the incident optical signal which is reflected at the interface between the cylindrical ferrule and the optical terminator; and (ii)=the portion of the incident optical signal which traverses the optical terminator and is reflected at the distal end thereof.

2. The optical terminator of claim 1 wherein the predetermined distance 'd' provides at least 20 dB of optical power loss at wavelengths of 1.3 μm and 1.5 μm.

3. The optical terminator of claim 1 wherein the refractive index is n=1.47±0.01 at optical wavelengths of 1.3 μm and 1.5 μm.

4. The optical terminator of claim 1 wherein the generally cylindrical structure is molded from a polymeric material.

5. The optical terminator of claim 4 wherein the optical terminator is fabricated by means of injection molding.

6. The optical terminator of claim 4 wherein the optical terminator is fabricated by means of compression molding.

7. The optical terminator of claim 4 wherein the heat deflection temperature under load (HDTL) is greater than 80° C.

8. The optical terminator of claim 4 wherein the polymeric material resists deformation in the presence of a compressive force of 2 pounds.

9. The optical terminator of claim 4, wherein the polymeric material comprises a methylpentene copolymer.

10. The optical terminator of claim 4 wherein the optical transmission of the terminator is modified by incorporating scattering or absorbing materials into the polymeric material.

11. The optical terminator of claim 4, wherein the polymeric material comprises a blend of polyacrylate and polyvinylidene fluoride polymers.

12. The optical terminator of claim 1 wherein the optical transmission is greater than 85% at optical wavelengths of 1.3 μm and 1.5 μm.

13. The optical terminator of claim 1 wherein the terminator includes an opening in the distal end that extends along the longitudinal axis into a cavity.

14. The optical terminator of claim 1 wherein the optical terminator is disposed within a housing for securing the optical connector to said housing such that the cylindrical ferrule and the plug are maintained in end-to-end contact.

15. A low-reflectance terminator for an optical fiber comprising a polymeric material having a refractive index n=1.47±0.01 at optical wavelengths of 1.3 μm and 1.5 μm, said polymeric material being positioned at the end face of the fiber in compressive engagement therewith, and said polymeric material extending for a predetermined distance away from the end face of the fiber along the longitudinal axis of the fiber to provide a minimum optical power loss of 20 dB.

16. The terminator of claim 13 wherein the polymeric material comprises a methylpentene copolymer.

17. The terminator of claim 14 wherein the optical transmission of the termination is modified by incorporating scattering or absorbing materials into the polymeric material.

18. The terminator of claim 13, wherein the polymeric material is a blend of polyacrylate and polyvinylidene fluoride polymers.

19. The terminator of claim 13, wherein the polymeric material is a methylpentene copolymer.

20. An optical fiber termination system having low reflectance, the system including:

an optical cable terminated in a connector, the cable comprising an optical fiber which is surrounded by a protective sheath system and the connector including a cylindrical plug having an axial passageway that extends from one end face thereof to the other, said optical fiber residing in the axial passageway and terminating in one end face of the plug;

an optical terminator comprising a generally cylindrical structure whose diameter is approximately equal to the diameter of the plug and whose refractive index is approximately equal to the refractive index of the optical fiber, said terminator having a longitudinal axis which extends from a distal end to a proximal end thereof, said proximal end being solid for a predetermined distance along the longitudinal axis and having an end face that is perpendicular to the longitudinal axis; and coupling apparatus having a cylindrical slot through a wall thereof, said slot being sized to receive the plug in one end thereof and the optical terminator in the other end.

21. A plug termination for terminating an optical fiber disposed within a cylindrical ferrule, said plug terminator comprising:

(a) a basically cylindrical plug whose diameter is approximately equal to the diameter of the cylindrical ferrule and whose refractive index is n=1.47±0.01 at optical wavelengths of 1.3 μm and 1.5 μm, said plug having a longitudinal axis that extends from a distal end to a proximal end thereof, said proximal end being solid for a predetermined distance along the longitudinal axis and having an end face that is perpendicular to the longitudinal axis;

(b) a base member holding an end portion of the plug;

(c) a housing enclosing at least a portion of the base member and having an internally disposed surface that is perpendicular to the longitudinal axis of the plug; and (d) a compression spring surrounding a portion of the base member, one end of the spring pressing against the base member and the other end of the spring pressing against the internally disposed surface, the compression spring urging the base member in a direction along the longitudinal axis of the plug toward its proximal end.

22. The plug termination of claim 21 wherein the cylindrical plug is molded from a polymeric material.

23. A receptacle termination for terminating an optical fiber disposed within a cylindrical ferrule, said cylindrical ferrule being held within an optical connector, the receptacle terminator comprising:

(a) a generally cylindrical plug disposed within an alignment sleeve, said plug having a diameter which is approximately equal to the diameter of the cylindrical ferrule and having a refractive index n=1.47±0.01 at optical wavelengths of 1.3 μm and 1.5 μm, said plug having a longitudinal axis that extends from a distal end to a proximal end thereof, the proximal end being solid for a predetermined distance along the longitudinal axis and having an end face that is perpendicular to the longitudinal axis;

(b) the alignment sleeve being adapted to receive at least an end portion of the cylindrical ferrule and to support same in end-to-end contact with the plug; and (c) a housing for holding said alignment sleeve and comprising means for securing the optical connector to the housing such that the cylindrical ferrule and the plug are maintained in end-to-end contact.

24. The receptacle termination of claim 23 wherein the cylindrical plug is molded from a polymeric material.

* * * * *